US 6,608,924 B2

(12) United States Patent
Soliman

(10) Patent No.: US 6,608,924 B2
(45) Date of Patent: Aug. 19, 2003

(54) NEURAL NETWORK MODEL FOR COMPRESSING/DECOMPRESSING IMAGE/ACOUSTIC DATA FILES

(75) Inventor: Hamdy S. Soliman, Socorro, NM (US)

(73) Assignee: New Mexico Technical Research Foundation, Socorro, NM (US)

( * ) Notice: Subject to any disclaimer, the term of this patent is extended or adjusted under 35 U.S.C. 154(b) by 0 days.

(21) Appl. No.: 10/010,848

(22) Filed: Dec. 5, 2001

(65) Prior Publication Data

US 2003/0103667 A1 Jun. 5, 2003

(51) Int. Cl.[7] ................................................. G06K 9/62
(52) U.S. Cl. ........................ 382/157; 382/233; 382/244
(58) Field of Search ................................. 382/155, 156, 382/157, 158, 233, 244; 700/47, 48; 128/925; 706/15, 26; 708/203; 704/202, 232, 503, 504

(56) References Cited

U.S. PATENT DOCUMENTS

| 5,398,302 A | * | 3/1995 | Thrift | 706/25 |
| 5,598,354 A | * | 1/1997 | Fang et al. | 708/203 |
| 5,734,796 A | * | 3/1998 | Pao | 706/16 |
| 5,812,700 A | * | 9/1998 | Fang et al. | 382/239 |
| 6,404,923 B1 | * | 6/2002 | Chaddha | 382/240 |

* cited by examiner

*Primary Examiner*—Samir Ahmed
(74) *Attorney, Agent, or Firm*—R W Becker & Associates; R W Becker

(57) ABSTRACT

A new neural model for direct classification, DC, is introduced for acoustic/pictorial data compression. It is based on the Adaptive Resonance Theorem and Kohonen Self Organizing Feature Map neural models. In the adaptive training of the DC model, an input data file is vectorized into a domain of same size vector subunits. The result of the training (step 10 to 34) is to cluster the input vector domain into classes of similar subunits, and develop a center of mass called a centroid for each class to be stored in a codebook (CB) table. In the compression process, which is parallel to the training (step 33), for each input subunit, we obtain the index of the closest centroid in the CB. All indices and the CB will form the compressed file, CF. In the decompression phase (steps 42 to 52), for each index in the CF, a lookup process is performed into the CB to obtain the centroid representative of the original subunit. The obtained centroid is placed in the decompressed file. The compression is realized because the size of the input subunit ((8 or 24)*$n^2$ bits) is an order of magnitude larger than its encoding index $\log_2$ [size of CB] bits. In order to achieve a better compression ratio, LZW is performed on CF (step 38) before storing (or transmitting) it.

6 Claims, 4 Drawing Sheets

(a)- 1st run₀ of input subunits vectors:
0, 4, 8, 48, 52, 56, 96, 100, 104

(b)- 2nd run₁ of input subunits vectors:
1, 5, 9, 49, 53, 57, 97, 101, 105

(c)- 5th run₄ of input subunits vectors:
12, 16, 20, 60, 64, 68, 108, 112, 116

(d)- 16th run₁₅ of input subunits vectors:
39, 43, 47, 87, 97, 95, 135, 139, 143

FIG.2: An example of dividing a 144-subunit image into 9 regions, and construction of some subunits runs$_{0,1,...,4,...,15}$ to be used in the construction of the input training sequence domain of subunits ITSS = run₀  run₁  ...  run₄  ...  run₁₅
Note that, in general, the selection of a subunit position to form a run is not always (as above) Sequential (i.e., 0,1,2, 3, ... , 15), but it might be of any order $i_k$, for 0<= k <= 15 (region size-1).

NEURAL NETWORK MODEL FOR COMPRESSING/DECOMPRESSING IMAGE/ACOUSTIC DATA FILES

BACKGROUND OF THE INVENTION

My invention relates to compressing and decompressing data (acoustic and still/moving images). More precisely, the invention is directed to the still document image data compression utilizing the adaptive vector quantization theory (AVQ) and its implementation as reflected in the Kohonnen Self Organizing Feature Map (KSOFM) neural model and the Adaptive Resonance Theorem (ART). My work is in the same direction of the well known Wavelet and JPEG image compression techniques with the major difference in the make of the lookup tables, i.e., codebooks. The formation of the lookup tables in my model is carried out via the training of hybrid SOFM&ART neural models, with some modification. The main motivation of my invention is the poor performance (and sometimes the inability to perform at all) of the aforementioned peer techniques in some image domains (e.g., document image compression), as we experimentally discovered. For contrast, in some document image domains, my model compression engine performs exceptionally well, both in the compression ratio and the image quality compared to Wavelet & JPEG. For some very complex documents with complicated colors charts writings, and backgrounds, Wavelet (represented by the state of the art commercial product, DjVu Solo) failed to compress/decompress the document correctly, while maintaining a competitive compression ratio. Their recovered decompressed documents lost the original colors and/or text is distorted, in some places. The DjVu applies the character recognition approach in compressing documents, a feature which caused such deficiency in the compression performance. In the same document domain, my model is able to recover correctly "all" documents that the peer technique could not recover. Even though another Wavelet commercial product, MrSID, was able to recover such images correctly, as pictures instead of documents, my technique performed much better in compression ratio for the same (or better) visual quality.

My model, as well as Wavelet/JPEG, utilizes the vector quantization (VQ) approach. The VQ mechanism clusters the input subunit vectors (k-dimension) via the mapping of all similar (based on some error difference) into one representative vector called centroid. A difference measure between vectors X and Y is the squared error $\|X-Y\|^2$, Euclidian distance. All obtained centroids are stored in a simple lookup table (codebook) which is to be used at the encoding/decoding phases. The manufacturing mechanism and the nature of the generated codebook is the key distinction of our work.

Based on the VQ approach, a new hybrid neural model (CD) that combines some features of the well known neural models: KSOFM and ART. The CD model follows the main theme of both models and adds its own modifications to exact details of their learning mechanisms. The Kohonnen SOFM is an unsupervised neural model implementation of the AVQ theorem. It uses a set of neurons each of which is connected to the input training vector via a set of weights connections called neuron weight vectors (NWVs). The NWVs are initialized to some random small values (or some pre-known values) then with each introduction of a training vector X, the closest NWV to X (based on their Euclidean distance, ED) will be declared a winner and brought closer to X (and for that matter, all similar vectors to X). Not only the winner NWV will be updated, but also all of its neighborhood vectors with decreasing values. The training of the SOFM engine is unsupervised and theoretically terminates at centroid conversion time, i.e., when the movement of all centroids is virtually zero, for two consecutive training epochs. The above stopping condition results in a training time complexity of $Q(N^2)$, where N is the input/centroid vector length.

The other clustering neural model is the ART. Even though SOFM and ART share the same goal (AVQ), yet their training is totally different. In ART, upon receiving an input subunit, a quick scan to the existing set of centroids will result in the formation of a possible winners set of centroids, PWC, of the input subunit. Among the PWC members, the input subunit will be more accurately (pixel-by-pixel) matched to each member centroid; and the closest match is announced the winning centroid. A failure to identify a subunit membership, to some class (under some matching constraints), forces the addition of a new centroid with the subunit value, as the only member in a newly formed class.

In our unsupervised clustering CD model, the centroids codebook table is initially empty. As the training progresses, we apply the ART philosophy: "if there is no true winner centroid for a subunit, add the subunit as a new centroid in the codebook". The decision of a true winner centroid, for an input subunit, is made in two phases. We initially construct a PWC set (stated above) of centroids that have the number of pixel differences, with the input subunit, less than some tight threshold, T1. Then, comparing the input subunit with each member in the PSC set, we add up the pixels' error differences (pixel by pixel) to obtain a mean error value, ME. The centroid with the minimal ME is announced the true winner of the input subunit, i.e., its representative, given that the computed ME does not exceed some threshold, T2. Only the true winner centroid value is updated, using the input subunit. Otherwise, if there is no true winner for the input subunit (based on T1&T2 above), the input subunit is to be added to the codebook, as its own new centroid. Thus, in deciding the true winner, we follow the sole of the ART. But, in the process of updating the winning centroid, we follow the mechanism of SOFM "winner-takes-all". The winning centroid only will be moved closer to the input subunit, by updating its value to be the average of all of its class members with the newly added subunit. Thus, we can say that our CD model is a mixture of a simplified SOFM and ART models, gaining the training speed/simplicity of SOFM and the ART elasticity/accuracy.

SUMMARY OF THE INVENTION

We present a direct classification (DC) model for pictorial document or acoustic data compression which is based on the adaptive vector quantization theory (AVQ). We deploy a quantization mechanism that utilizes some concepts of the SOFM and ART neural net models. Starting with an empty synaptic weight vectors (code book), a very simplified ART approach is adopted by the DC model to build up the codebook table. Then, the training and the updating of the centroids in the codebook is based on some of the KSOFM rules. Simply, the DC model divides the input data (e.g., document image) into N same size ($n^2$ gray/colored pixels) subunits. Then, divide the N subunits into L equal size regions, each of s subunits (s=N/L), grouping all same index $i_k$ (0<=k<=(s−1)) subunits in all regions into a "$run_{i(k)}$" of size L subunits. Notice that, selection of subunit $i_k$ from a given region, when constructing a run, is in any order, yet is consistent over all regions per each run. The concatenation of $run_1$ through $runs_{L-1}$ forms the total input domain of subunits. For some input domains, e.g., pictorial images, the construction of the regions and the selection of subunit per a region is done for one subunit selection only (total L subunits) to initialize the L centroids in the codebook. Then, after codebook initialization, the input subunits domain is just the remaining N-L subunits scanned sequentially, with no regional divisions. Then, the DC model clusters the input domain into classes of similar subunits (close orientation vectors); each class will have a vector representative, called a centroid. The mechanism incrementally constructs a codebook of centroids to be placed in the DC neurons synaptic weight vectors. Each centroid will have a limited size (size=TrainSetMax) subset out of all classified subunits (SCS), that will be the only contributing subunits in its training. The reason we restrict the centroid updating to only a subset of the class member subunits is to enhance quality at decompression. We consider the first TrainSetMax subunits to be the closest to the formed centroid, by the locality principle. Any other incoming subunits exceeding TrainSetMax might falsely update the centroid value away from the already used subunits, resulting in poor centroid representation training subunits. Each centroid represents the center of mass (average) of all classified member subunits. The centroid index (in the hosting codebook) is used to replace any member subunit in the final compressed image file of indices. At the decompression phase, indices in the compressed file will be used to obtain corresponding centroids from the codebook and store them, in order, at the decompressed file.

The goal of the first DC processing phase (training/compression) is to build up the centroid codebook, while obtaining the winning centroid (WC) for every input subunit and store its indices file. The process of obtaining the WC has two steps. First, all possible winning centroid sets (PWC) are established, based on very strict similarity measure (pixel-by-pixel within very tight threshold). The DC model starts by sequencing through the divisions of the original image domain of subunits. Every input subunit S will be checked against all existing nonempty codebook table entries, one by one, forming the PWC set of centroids with the closest pixel distance (PD), steps 12 through 18. The PD calculation is based on pixel-by-pixel comparison between S and every centroid in the codebook, while associating the number of different pixels (ND), within some threshold value (T1). All centroids with ND less than some threshold count (T2) will be grouped in a PWC set for S; an idea which is borrowed and modified from the ART approach. An empty PWC asserts that there is no similar centroid to S (based on T1&T2), and we prepare to insert S in the codebook as a new centroid. In order to insert S in the codebook, we check the codebook for free entries. If there is a free entry, we insert S in it as a new centroid and add S to the new centroid SCS, i.e., the class membership, as the first member. Then we use its new table entry as the S compression index $CI_s$. If the codebook is full, then S will be associated with the nearest centroid in the codebook (based on the error ME measurement), i.e., we consider the total codebook entries as the PWC for S. Then, we calculate the ME between S and every centroid member of the obtained PSW. The centroid with the minimal ME reading will be the winner, i.e., S's WC. For the obtained WC, we add S to its SCS; and if the size of SCS does not exceed some limiting threshold, S is allowed to update WC. The mechanism of updating only the wining centroid is based on the KSOFM model "winner take all". We update the WC by re-computing all of its pixel values as the average of all member subunits pixels, including its newly added member S, if possible. Finally, we store the WC's codebook index as S's CI in the compressed file of indices. We repeat the process for every input subunit S in the original file. At the end of the training/compression phase we add the obtained set of synaptic vectors (the codebook) at the end of the compressed file of CIs (indexes file). For compression ratio efficiency, we compress the obtained compressed image file using the lossless LZW technique. Notice that the index's size is an order of magnitude shorter than the size of the original input subunit vector; thus yielding the effect of image data compression.

The second phase of the process is the decompression step. An indices file is to be LZW unzipped. Each index in the indices file, in sequence, is used to obtain a centroid from the codebook, which will be placed in the decompressed file. The decompressed file is an approximation of the original image file, within certain controlled quality (based on the user choice of the codebook limiting size, and the different used thresholds, T1, T2 above).

BRIEF DESCRIPTION OF THE DRAWINGS

The present invention exists in the construction, arrangement, and combination of the various parts of the device, whereby the objects contemplated are attained as hereinafter more fully set forth, specifically pointed out in the claims, and illustrated in the accompanying drawings, in which:

FIG. 2 shows an example of grouping the input subimage vectors, and their sequence of presentation to the system;

DETAILED DESCRIPTION OF THE PREFERRED EMBODIMENTS

Figure 5:
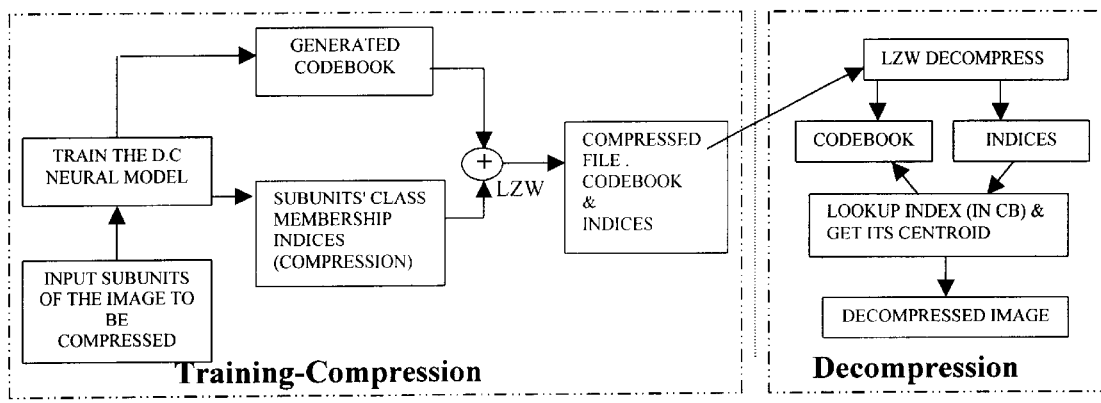
FIG. 5 illustrates the dataflow between different stages of the invention mechanism.

Referring now to the figures illustrating preferred embodiments of the invention, the figures are intended only for explanation purposes and not for the purpose of limiting same. FIG. 5 is a flowchart of the overall preferred embodiment. Even though the mechanism operates in conjunction with software based control, it is contemplated that the procedure be embodied in other media.

Figure 3:
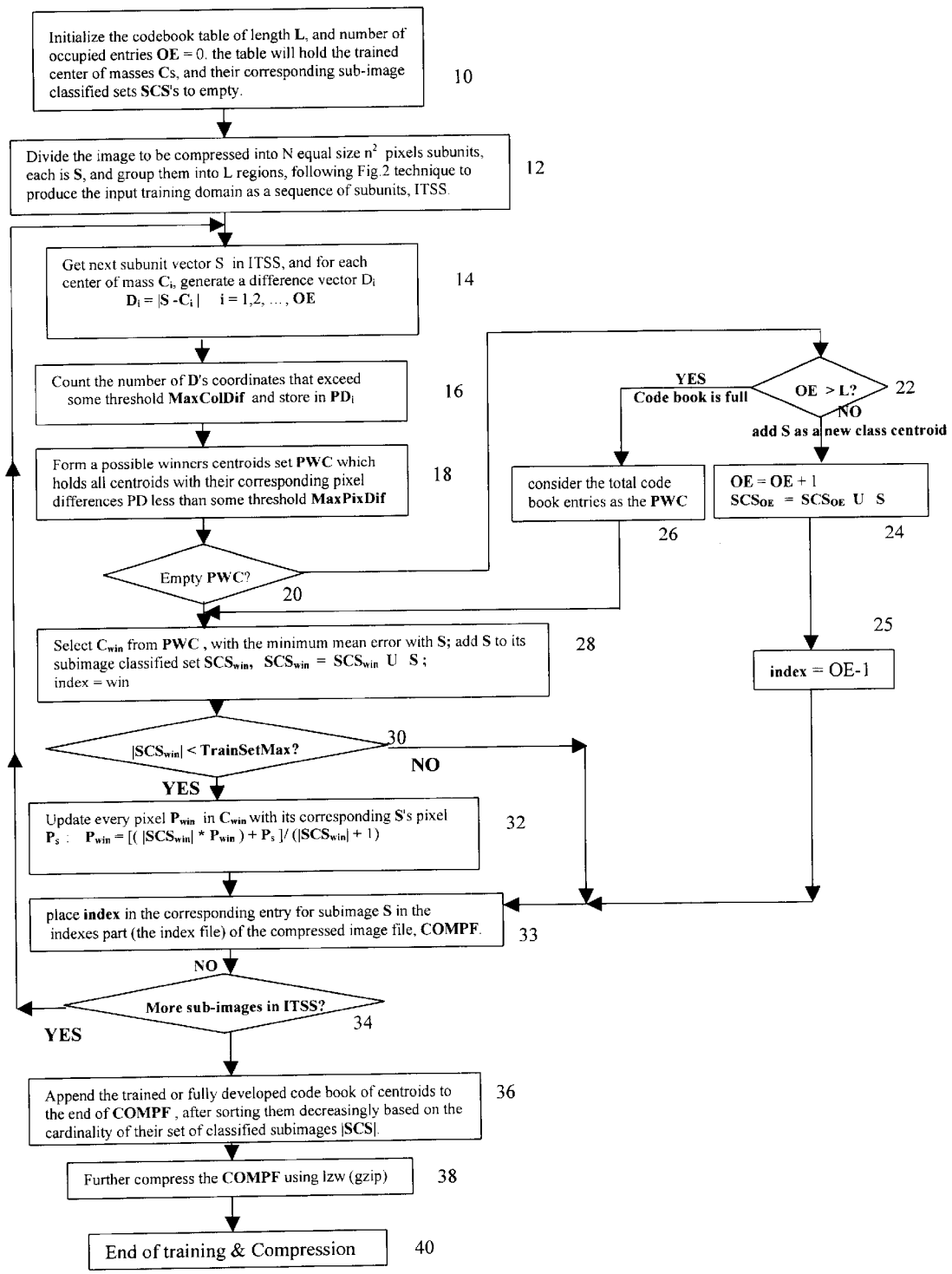
FIG. 3 is a flowchart representing the preferred method of the present invention, concerning the training-compression phase.
Figure 4:
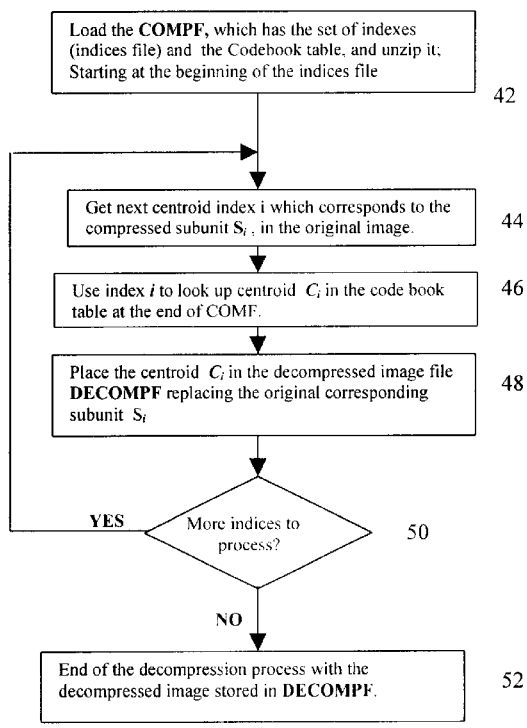
FIG. 4 is a flowchart representing the preferred method of the present invention, concerning the decompression phase.

There are two phases to the invention control engine. The first phase (FIG. 3) is the training/compression which has two subphases. The first subphase is the training phase, which runs in parallel with the second image compression subphase. The training process of the CD neurons produces a codebook of centroids (subphase 1), which is concurrently used to produce the compressed indices file. The second phase is the decompression phase, which takes a file of indices and the trained codebook and produces the decompressed image file (FIG. 4).

Figure 1A:
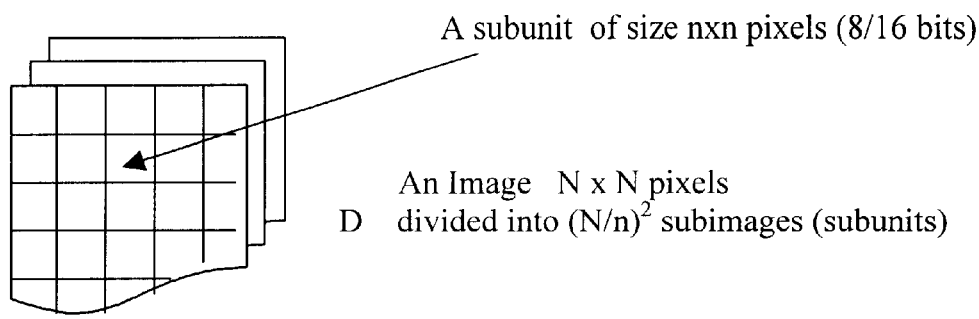
FIG. 1a illustrates the dividing of an input pictorial data into equal size subunit' vectors.

The training subphase (steps 10 to 32) starts with the presentation of $N^2$ pixel images (colored/monochrome) or a sequence of N bytes acoustic data. FIG. 1a shows the partitioning of each input image into C subunits vectors, each of size $n^2$. FIG. 2 shows the process of constructing the input training sequence of subunits, ITSS. The process starts with the dividing of the image subunits into L equal size regions of s subunits (s=C/L). Then, the ITSS is formed by the concatenations of a sequence of s runs (R) of subunits:

ITSS=$Ri_0$ $Ri_1$ $Ri_2$ ... $Ri_r$ ... $Ri_{s-1}$, where run $R_r$=Sequence of L subunits ($S_j^r$ | r is the index sequence: ($i_0, i_1, i_2, \ldots, i_n, \ldots, i_m, i_{s-1}$), with $i_n, i_m$, etc. being distinct positions in a region, i.e. being distinct indices) (we can say that $S_j^r$ in the $r^{th}$ subunit in the $j^{th}$ region).

Thus, the formation of a run in the ITSS is carried out by sequencing the selection of one subunit at a fixed region position, covering all regions; with each run having subunits from a distinct region position. Thus, the number of runs has to equal the size of a region (i.e., a run per a unique subunit position in order to cover all subunits in all regions). Also, the run size equals the number of regions since we select one subunit in the run from each region (at a distinct position).

The main motivation behind the construction and the use of the ITSS sequence as the input training domain is to evenly distribute the training of the codebook' centroids over the entire image, instead of saturating the codebook with knowledge about only the beginning part of the input image. Such early saturation would result in a great degradation of the recovered (decompressed) image quality.

Figure 1B:
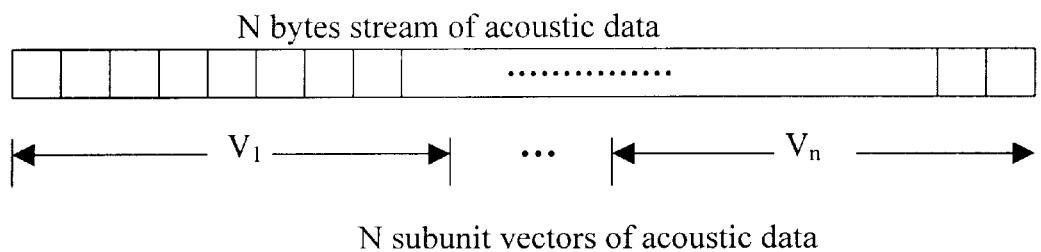
FIG. 1b illustrates the dividing of an input acoustic data into equal size vectors.

Subunits in the ITSS will be used, in sequence, as training vectors (step 10). In FIG. 1b, the acoustic data byte stream will be divided into n dimensions vectors. Without loss of generality, this discussion is focused on images only, and the processing of acoustic data will be the same.

The main goal of the CD neurons synaptic weights training is to cluster all input training subunits in classes of similar vectors (pixelwise); similarity is based on some mean error (difference) distortion measure, ME, between class members. Training subunits will be presented only once to the DC engine of neurons. Using the input subunits, each $n^2$-dimension neuron synaptic weight vector, C, will be trained to develop into the center of mass (average) of some similar subunits cluster. The compression subphase (step 33) will be in parallel to the training phase, where the compressed indices file is incrementally built via the placement of some C index, in the codebook table, for every subunit member in the class represented by C. In order to decide class C membership for subunit S, first we construct the set of all possible winner (true match) centroids for S.

Initially, a neuron C vector is initialized by the first subunit S which does not match any other neuron centroid (step 24). As the training progresses (step 14, 16 and 18), and as neuron C is declared the closest match (winner) to more input subunit vectors, its value (orientation) will be updated in order to bring it closer to every won subunit (step 26, 28, 30, 32 and 33). The process of updating C involves only a subset of C classified input training subunits. The classified subunit will be assigned the index of C in the codebook. Updating C is done whenever the cardinality of SCS is below some threshold of classified subunits (step 30). The result is that each centroid $C_i$ will be the average of all contributing input subunits in the training process. Thus, we can say that the training of centroid $C_i$ ends when its SCSI reaches its maximum allowed training threshold. The class membership is decided for any input subunit based on the difference between such subunit and every centroid $C_i$ in the codebook. If the closest centroid to the input subunit is $C_{win}$, then the index win will be assigned to the subunit in the indices file. Theoretically, all active synaptic weight vectors (Cs) will keep moving in the $n^2$-dimension vector space until each gets to its approximated center-of-mass of some class. This new approach takes much less time than the actual theoretical analysis of the Kohonen neural model. At the end of the first phase, the set of neurons weight vectors is used as the final codebook of centroids (one codebook for each image/acoustic file); also, an indices file with an entry for each input subunit, in the order of their presentation, is produced. The codebook will be appended at the end of the indices file (step 36), and the total compression file will be compressed using LZW (step 38), for more compression efficiency.

The decompression phase (steps 42, 44, 46, 48, 50 and 52) starts with the LZW decompression of the total compression indices file, and the codebook is extracted. Then, the indices file is read sequentially (index by index); and for each index, i, which represents the $i^{th}$ original subimage, $S_i$, is used to directly access the $S_i'$ centroid representative $C_i$, from the codebook table (array of centroids). The obtained $C_i$ is inserted in the decompressed file that represents an approximation of the original image. The recovered image quality (Q) value is measured by the total difference (pixel by pixel) between the original and the decompressed images. The compression ratio (CR) is based on the byte count ratio of the original image file and its compressed file. The decompression quality values are subject to user choice, via the different threshold parameters.

The present invention is, of course, in no way restricted to the specific disclosure of the specification and drawings, but also encompasses any modifications within the scope of the appended claims.

I claim:

1. A method of producing a codebook and an indices file for a data decompression unit, said method including the steps of:

a) reading an input data to be compressed;

b) dividing the read data into a set of N equal size input training domain subunits;

c) grouping the subunits set into L equal size regions of N/L subunits;

d) constructing the input training domain of subunits as a sequence of N/L runs ($run_{i(1)}, run_{i(2)} \ldots run_{i(j)} \ldots run_{i(n)} \ldots run_{i(m)} \ldots run_{i(N/L)}$, each with L subunits, wherein $run_{i(j)}$ consists of the $i_j^{th}$ position subunit from each of the L regions; and $i_n \neq i_m$ for $n \neq m$, $1 <= n,m <= N/L$, wherein $i_n$ and $i_m$ are distinct indices e) using one subunit at a time from the training input domain to train a neural network model to cluster the input training domain into classes of similar subunits for continued development of a center of mass, known as a centroid, for each class, wherein the centroids are to be tabulated into a codebook;

f) storing a representative centroid index, of the codebook, for each input training subunit in an indices file;

g) repeating steps e) and f) sequentially for all subunits in the input training domain to fully develop the centroids within the codebook; and:

h) appending the codebook at the end of the indices file to form a final compressed file.

2. A method according to claim 1, wherein, in the formation process of a "run", a subunits selection from each region of the N/L subunits can be in any order, yet fixed over all regions per a run, with no repetitions between runs.

3. A method according to claim 1, including the step of applying a traditional lossless data compression technique on the compressed file.

4. A method according to claim 1, wherein the codebook centroids are initialized using L subunits, one from each region (in any order), then the input training domain becomes the sequence of the original N subunits (with no runs), less the already selected subunits for the above codebook initialization.

5. A method according to claim 1 for decompressing a data file, including the further steps of:
   i) retrieving the indices file and the codebook from the compressed file;
   j) starting at the beginning of the indices file;
   k) reading an index from the indices file;
   l) using this index as an address to access the corresponding codebook entry to obtain its centroid subunit;
   m) storing the obtained centroid subunit in a decompressed file; and
   n) repeating steps k) to m) for all indices, in sequence, in the indices file to obtain the decompressed approximation of the original data file.

6. A method according to claim 3, which includes the further step of decompressing the compressed file using a previously utilized lossless technique if applicable.

* * * * *